United States Patent [19]

Short

[11] Patent Number: 4,735,529

[45] Date of Patent: Apr. 5, 1988

[54] COMBINED CUTTING AND DRILLING TOOL HOLDER FOR A METAL REMOVING MACHINE

[75] Inventor: Wade Short, Kendallville, Ind.

[73] Assignee: Dana Corporation, Toledo, Ohio

[21] Appl. No.: 944,139

[22] Filed: Dec. 19, 1986

[51] Int. Cl.[4] ............................................. B23B 51/08
[52] U.S. Cl. ..................................... 408/225; 408/231
[58] Field of Search ............... 408/196, 197, 198, 201, 408/214, 225, 231, 232, 239 R, 239 A, 240

[56] References Cited

U.S. PATENT DOCUMENTS

| | | |
|---|---|---|
| 216,023 | 6/1879 | Crane . |
| 277,611 | 5/1883 | Richards . |
| 659,125 | 10/1900 | Boentgen . |
| 855,411 | 5/1907 | Oleson . |
| 1,229,565 | 6/1917 | Ahlgren . |
| 1,244,953 | 10/1917 | Budlong . |
| 1,599,611 | 9/1926 | Dover . |
| 2,053,253 | 9/1938 | Dennis et al. . |
| 2,358,608 | 9/1944 | Turner . |
| 2,368,009 | 1/1945 | Drane . |
| 2,678,826 | 5/1954 | Nick .................................. 408/239 X |
| 2,815,688 | 12/1957 | Forbes et al. . |
| 3,228,265 | 1/1966 | Stoddard et al. . |
| 3,387,510 | 6/1968 | Landolt .......................... 408/197 X |
| 3,395,435 | 8/1968 | Bremer . |
| 3,712,753 | 1/1973 | Manzi . |
| 3,877,099 | 4/1975 | Halpern . |
| 4,229,130 | 10/1980 | Franklin ..................... 408/239 R X |
| 4,248,555 | 2/1981 | Satou ................................... 408/225 |
| 4,340,327 | 7/1982 | Martins .......................... 408/225 X |
| 4,571,128 | 2/1986 | Ogden . |

FOREIGN PATENT DOCUMENTS 7318027 12/1974 France ............................... 408/201

OTHER PUBLICATIONS

Reillo Drawing Nos. 21-232-514 and 21-232-515, dated Oct. 1984.

Primary Examiner—Z. R. Bilinsky
Attorney, Agent, or Firm—MacMillan, Sobanski & Todd

[57] ABSTRACT

An improved tool holder for a metal removing machine includes a generally cylindrical head having a longitudinal passageway formed co-axially therethrough. The outer cylindrical surface of the head includes means for supporting one or more cutting tools thereon. The inner surface of the passageway formed through the head includes a threaded intermediate diameter portion and a relatively smaller diameter portion. An insert ring is disposed within the passageway at the junction of the intermediate and smaller diameter portions of the passageway. The insert ring includes a ramp surface which provides a smooth transition from the intermediate diameter portion to the relatively smaller diameter portion. A generally hollow cylindrical collet is provided which is sized to fit within the threaded intermediate portion of the passageway. The collet includes an enlarged end portion having a first chamfered edge adapted to abut the ramp surface of the insert ring when the collet is inserted in the passageway. A threaded hollow cylindrical shank is provided to retain the collet within the head. The external surface of the shank is threaded to cooperate with the threaded intermediate portion of the passageway. A longitudinal passageway is formed co-axially through the shank having a chamfered shoulder adapted to abut a second chamfered edge of the enlarged end portion of the collet when inserted within the passageway. Rotation of the shank within the threaded passageway causes the shank and the collet to be advanced longitudinally therethrough until the collet engages the ramp surface of the insert ring. A drill bit may be inserted through the head passageway into the interior of the collet. Further rotation of the shank causes the enlarged end portion of the collet to be compressed, thereby frictionally retaining the drill bit within the head.

6 Claims, 2 Drawing Sheets

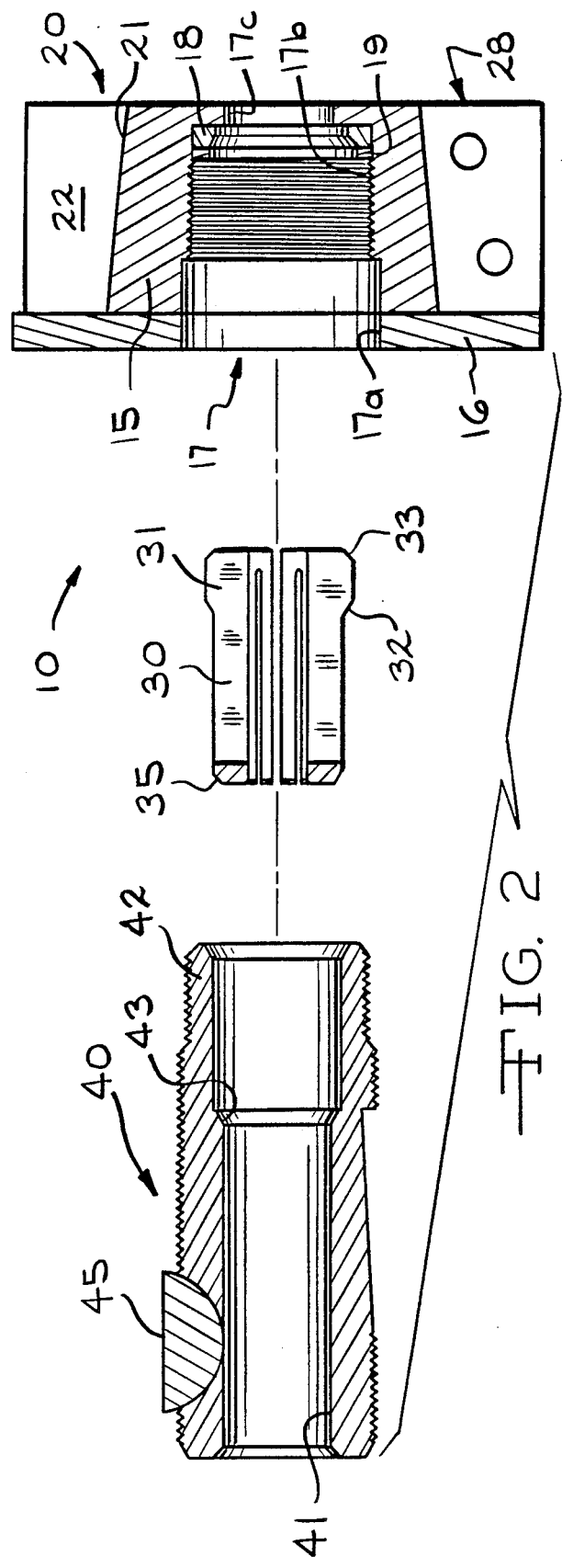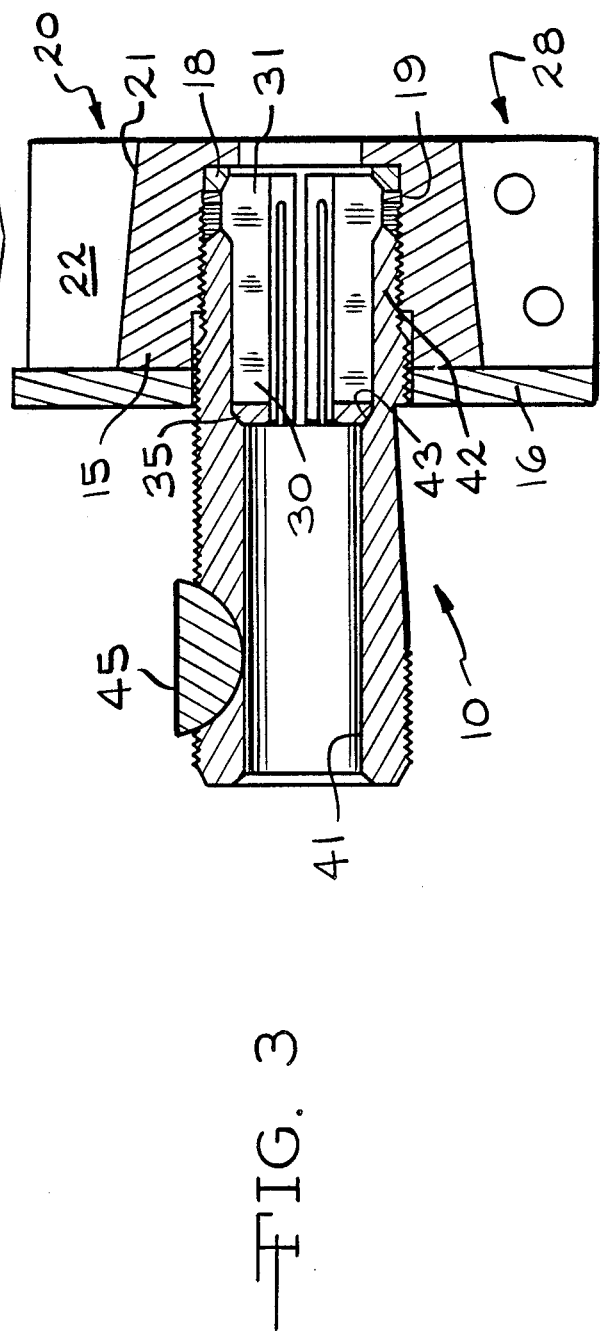
FIG. 2
FIG. 3

COMBINED CUTTING AND DRILLING TOOL HOLDER FOR A METAL REMOVING MACHINE

BACKGROUND OF THE INVENTION

The present invention relates in general to machines for removing metal from metallic workpieces and in particular to an improved holder for supporting both cutting and drilling tools which is adapted for use with a metal removing machine having a rotatable driving mechanism.

The shaping of metallic workpieces to a desired form by removing metal therefrom is one of the most important manufacturing processes utilized in the modern world. Many different methods are known for selectively removing metal from such workpieces, such as chiseling, filing, cutting, drilling, and the like. Each metal removing method is suited to achieve a particular shape or configuration of the workpiece upon which it is utilized, and various tools are known for accomplishing each of these methods. As the metal working industry has begun to automate, there have been developed numerous machines for holding and operating such tools and the metallic workpieces upon which they are utilized. In the past, a single metal removing tool was held and operated (typically by rotation) at a single work station of the machine, while the metallic workpieces were indexed through a series of different work stations. In this manner, a workpiece requiring multiple metal removing steps could be efficiently produced. More recently, multiple metal removing tools have been mounted on a combined tool holder at a single work station of the machine. Since two metal removing processes can be performed at a single work station, the efficiency of the machine is greatly enhanced by the combined tool holder. However, in order to promoted such efficiency, the combined tool holder must be simple to utilize and must be able to quickly and accurately position each of the metal removing tools thereon.

SUMMARY OF THE INVENTION

The present invention relates to an improved tool holder for a metal removing machine which easily and accurately supports both cutting and drilling tools thereon. The combined tool holder includes a generally cylindrical head having a longitudinal passageway formed co-axially therethrough. The outer cylindrical surface of the head includes means for supporting one or more cutting tools thereon. The inner surface of the passageway formed through the head includes a threaded intermediate diameter portion and a relatively smaller diameter portion. An insert ring is disposed within the passageway at the junction of the intermediate and smaller diameter portions of the passageway. The insert ring includes a ramp surface which provides a smooth transition from the intermediate diameter portion to the relatively smaller diameter portion. A generally hollow cylindrical collet is provided which is sized to fit within the threaded intermediate portion of the passageway. The collet includes an enlarged end portion having a first chamfered edge adapted to abut the ramp surface of the insert ring when the collet is inserted in the passageway. A threaded hollow cylindrical shank is provided to retain the collet within the head. The external surface of the shank is threaded to cooperate with the threaded intermediate portion of the passageway. A longitudinal passageway is formed co-axially through the shank having a chamfered shoulder adapted to abut a second chamfered edge of the enlarged end portion of the collet when inserted within the passageway. Rotation of the shank within the threaded passageway causes the shank and the collet to be advanced longitudinally therethrough until the collet engages the ramp surface of the insert ring. A drill bit may be inserted through the head passageway into the interior of the collet. Further rotation of the shank causes the enlarged end portion of the collet to be compressed, thereby frictionally retaining the drill bit within the head.

It is an object of the present invention to provide an improved combined tool holder for a metal removing machine which supports both cutting and drilling tools.

It is another object of the present invention to provide such an improved combined tool holder which accurately supports each of the tools thereon in desired positions.

It is a further object of the present invention to provide such an improved combined tool holder which is simple and inexpensive in operation.

Other objects and advantages of the present invention will become apparent to those skilled in the art from the following detailed description of the preferred embodiment, when read in light of the accompanying drawings.

BRIEF DESCRIPTION OF THE DRAWINGS

FIG. 2 is an exploded sectional elevational view of the combined tool holder illustrated in FIG. 1.

FIG. 3 is a sectional elevational view similar to FIG. 2 showing the components of the combined tool holder in an assembled position.

DETAILED DESCRIPTION OF THE PREFERRED EMBODIMENT

Figure 1:
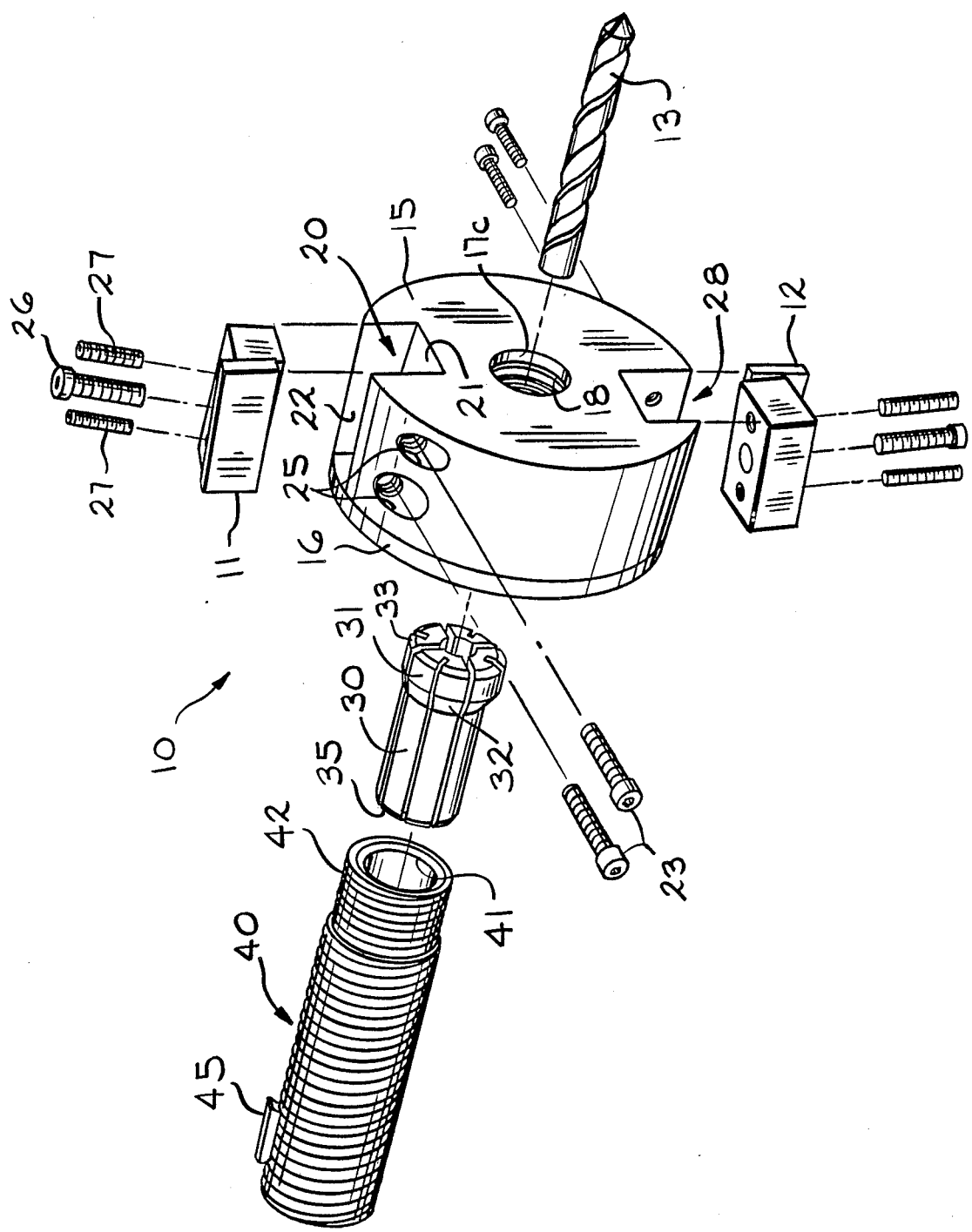
FIG. 1 is an exploded perspective view of an improved combined tool holder in accordance with the present invention, including a pair of cutting tools and a drill bit adapted to be supported thereon.

Referring now to the drawings, there is illustrated an improved combined tool holder, indicated generally at 10, in accordance with the present invention. The tool holder 10 is adapted to be secured to a metal removing machine (not shown) for supporting both the tool holder 10 and a metallic workpiece (not shown). As will be explained in greater detail below, the tool holder 10 simultaneously supports a pair of opposed cutting tools 11 and 12 and a drill bit 13 for rotation therewith and for engagement with the workpiece. The structure and operation of the machine, as well as the cutting tools 11 and 12 and the drill bit 3, are well known in the art and form no part of the present invention. Briefly, however, the machine rotates the tool holder 10 relative to the workpiece and selectively moves the metal removing tools 11, 12, and 13 supported by the tool holder 10 into engagement with the workpiece. As a result, metal is selectively removed from the workpiece, and the workpiece is formed into a desired shape.

As best shown in FIGS. 2 and 3, the tool holder 10 includes a generally cylindrical head 15 having a backing plate 16 secured thereto by a plurality of threaded fasteners (not shown). The function of the backing plate 16 will be explained below. An internal passageway, indicated generally at 17, is formed through the head 15 along its longitudinal axis. The passageway 17 includes a larger diameter portion 17a having a smooth inner surface, an intermediate diameter portion 17b having an internally threaded surface, and a smaller diameter portion 17c having a smooth inner surface. The relatively larger diameter portion 17a of the passageway 17 also extends through the backing plate 16. For the purpose of simplifying the explanation of the present invention, the longitudinal end of the head 15 through which the relatively smaller diameter portion 17c of the passageway 17 is formed will be referred as the forward end of the tool holder 10, while the longitudinal end of the head 15 through which the relatively larger diameter portion 17a of the passageway 17 is formed will be referred as the rearward end of the tool holder 10. An insert ring 18 is inserted into the intermediate portion 17b of the passageway 17 adjacent the smaller diameter portion 17c thereof. The insert ring 18 includes a ramp surface which provides a smooth transition from the intermediate diameter portion 17b to the relatively smaller diameter portion 17. A C-shaped snap ring 19 is utilized to retain the insert ring 18 within the passageway.

A first slot, indicated generally at 20, is formed in the outer surface of the head 15. The first slot 20 includes an inner face 21 which is bounded by a pair of side walls 22. The inner face 21 of the slot 20 tapers radially inwardly from the rearward end of the tool holder 10 to the forward end thereof. As best illustrated in FIG. 1, a pair of transversely extending threaded fasteners 23 are provided which extend through respective first apertures 25 formed through the head 15. The fasteners 23 are adapted to be inserted and rotated through the apertures 25 so as to frictionally engage the cutting tool 11 and retain it within the first slot 20. A radially extending threaded fastener 26 is also provided which extends through the cutting tool 11 into engagement with a threaded aperture (not shown) formed in the head 15. A pair of positioning screws 27 extend through respective threaded apertures (not shown) formed through the cutting tool 11 into abutting engagement with the inner face 21 of the slot 20. The transverse threaded fasteners 23, the radial threaded fasteners 26, and the positioning screws 27 can be utilized in a known manner to secure the cutting tool 11 to the head 15 in a desired position relative thereto. The backing plate 16 provides an immovable surface against which the cutting tool 11 may be moved. A second slot, indicated generally at 28, is formed on the outer surface of the head 15 opposite to the first slot 20. The second slot 28 is provided to secure the cutting tool 12 to the head 15 in the same manner as described above.

A collet 30 is provided for securing the drill bit 13 to the head 15. The collet 30 is a unitary member which is generally hollow and cylindrical in shape. The collet 30 includes a plurality of finger-like projections which are flexible radially inwardly so as to selectively frictionally engage the non-drilling end of the drill bit 13 when it is inserted therein. The collet 30 is formed having an enlarged outer diameter end portion 31. The longitudinal edges of the end portion 31 are chamfered, as shown at 32 and 33, to provide ramp surfaces between the body of the collet 30 and the end portion 31 and between the end portion 31 and the end face of the collet 30. The outer diameter of the end portion 31 of the collet 30 is sized to be larger than the inner diameter of the relatively smaller diameter portion 17c of the passageway 17, but smaller than the inner diameter of the threaded intermediate portion 17b thereof. When the collet 30 is inserted into the passageway 17, therefore, the forward chamfered edge 33 of the enlarged end portion 31 abuts the ramp surface of the insert ring 18, as shown in FIG. 3. The rearward end of the collet 30 opposite the enlarged end 31 is also provided with a chamfered edge, as shown at 35.

A hollow cylindrical shank, indicated generally at 40, is provided to retain the collet 30 within the head 15 and to connect the tool holder 10 to the machine. The design of the tool shank 40 can be varied to the needs of the machine tool to which it is applied (i.e., tapered shank using a draw bar, straight shank, automotive shank, etc.). A longitudinal passageway 41 is formed through the shank 40. The shank 40 includes an end portion 42 which is sized and externally threaded to cooperate with the threaded intermediate diameter portion 17b of the passageway 17. The portion of the passageway 41 which extends through the end portion 42 is slightly larger in diameter than the rest of the passageway 41. A chamfered shoulder 43 is formed at the junction of the two differently sized portions of the passageway 41. The larger diameter portion of the passageway 41 is sized to receive the smaller diameter portion of the collet 30 therein, but not the enlarged end portion 31 thereof. When inserted therein, as illustrated in FIG. 3, the chamfered edge 35 of the collet 30 abuts the chamfered shoulder 43 of the shank 40, while the rearward chamfered edge 32 of the enlarged end portion 31 abuts the forward end of the shank 40. The body of the shank 40 is also externally threaded to permit a secure connection thereof to the machine. A key 45 may be provided in the shank to permit the machine to rotate the shank 40, as well as the collet 30 and the head 15 carried thereby.

To use the tool holder 10, the cutting tools 11 and 12 are initially positioned relative to the head 15 and secured thereto in the manner described above. Next, the collet 30 is inserted within the passageway 17 formed through the head 15, with the enlarged end portion 31 being oriented toward the forward end. The shank 40 is then inserted within the passageway 17 and rotated such that the threaded end portion 42 engages the threaded intermediate diameter portion 17b. Such rotation is continued until the the enlarged end portion 31 of the collet 30 is loosely engaged between the head 15 and the shank 40. In this position, the forward chamfered edge 33 of the enlarged end portion 31 abuts the ramp surface of the insert ring 18, while the the rearward chamfered edge 32 of the enlarged end portion 31 abuts the forward end of the shank 40.

The drill bit 13 is next inserted through the relatively smaller diameter portion 17c and the intermediate diameter portion 17b of the passageway 17 until it is received within the enlarged end portion 31 of the collet 30. The head 15 is then further rotated relative to the shank 40, causing the enlarged end portion 31 of the collet 30 to become compressed between the insert ring 18 and the forward end of the shank 40. Such compression causes the plurality of finger-like projections of the collet 30 to move radially inwardly about the enclosed drill bit 13. Consequently, the drill bit 13 is secured to the head 15 for use.

In accordance with the provisions of the patent statutes, the principle and mode of operation of the present invention have been explained and illustrated in its preferred embodiment. However, it must be understood that the present invention may be practiced otherwise than as specifically explained and illustrated without departing from its spirit or scope.

What is claimed is:

1. A tool holder for supporting first and second metal removing tools thereon for use with a metal removing machine comprising:
    a head including a longitudinal passageway formed co-axially therethrough, said head passageway having a threaded first diameter portion, a second relatively smaller diameter portion, and an abutment surface defined between the two diameter portions, said head further including means for securing the first metal removing tool to the outer surface thereof;
    a collet disposed in said head passageway including an enlarged end portion having an outer diameter which is smaller than said first diameter portion and larger than said relatively smaller diameter portion of said head passageway, said collet further including a longitudinal passageway formed co-axially therethrough having a predetermined normal inner diameter and being compressible to reduce said predetermined normal diameter, a portion of the second metal removing tool adapted to be disposed within said collet passageway; and
    a shank including a longitudinal passageway formed co-axially therethrough, said shank passageway having an inner diameter which is smaller than said outer diameter of said enlarged end portion of said collet, said shank further including a threaded end portion received within said first diameter portion of said head passageway and adapted to cooperate therewith such that rotation of said shank relative to said head causes engagement of said collet between said shank and said abutment surface and compression of said collet so as to secure the second metal removing tool disposed therein to said head.

2. The invention defined in claim 1 wherein said collet is generally cylindrical in shape and includes a plurality of finger-like projections which are flexible radially inwardly to reduce to said predetermined normal inner diameter thereof.

3. The invention defined in claim 2 wherein said collet further includes a first chamfered edge formed on said enlarged end portion adapted to engage said abutment surface of said head portion.

4. The invention defined in claim 3 wherein said collet further includes a second chamfered edge formed on said enlarged end portion adapted to engage a end of said shank 5. The invention defined in claim 4 wherein said collet further includes a third chamfered edge formed on an end thereof and said shank passageway further includes a chamfered shoulder formed therein, said third chamfered edge and said chamfered shoulder adapted to engage one another.

6. A tool holder for supporting first and second metal removing tools thereon for use with a metal removing machine comprising:
    a generally cylindrical head having a passageway formed therein, said passageway including a threaded portion and an abutment means formed therein;
    means for securing the first metal removing tool on said head adjacent the periphery thereof;
    a shank having a threaded end portion received in said threaded portion of said passageway; and
    an elongated longitudinally slotted hollow cylindrical collet disposed in said head passageway between said abutment means and said threaded end portion of said shank, said collet adapted to receive a portion of the second metal removing tool and to frictionally engage said portion of the second metal removing tool when said shank is rotated relative to said head.

* * * * *